(12) United States Patent
Takamura

(10) Patent No.: US 9,773,193 B2
(45) Date of Patent: Sep. 26, 2017

(54) IMAGE PROCESSING APPARATUS, IMAGE PROCESSING METHOD, AND PROGRAM

(71) Applicant: CANON KABUSHIKI KAISHA, Tokyo (JP)

(72) Inventor: Akihiro Takamura, Kokubunji (JP)

(73) Assignee: Canon Kabushiki Kaisha, Tokyo (JP)

( * ) Notice: Subject to any disclaimer, the term of this patent is extended or adjusted under 35 U.S.C. 154(b) by 151 days.

(21) Appl. No.: 14/669,507

(22) Filed: Mar. 26, 2015

(65) Prior Publication Data
US 2015/0281570 A1    Oct. 1, 2015

(30) Foreign Application Priority Data
Mar. 27, 2014   (JP) ................. 2014-066364

(51) Int. Cl.
  *G06K 9/40*   (2006.01)
  *G06K 9/54*   (2006.01)
  *G06K 9/62*   (2006.01)
  *H04N 5/217*  (2011.01)

(52) U.S. Cl.
CPC .......... *G06K 9/6215* (2013.01); *H04N 5/217* (2013.01)

(58) Field of Classification Search
USPC ................................. 382/305, 254
See application file for complete search history.

(56) References Cited

U.S. PATENT DOCUMENTS

| 9,479,712 B2 * | 10/2016 | Voss | H04N 5/272 |
| 2008/0175491 A1 * | 7/2008 | Kondo | G06F 17/30247 |
| | | | 382/232 |
| 2012/0075482 A1 * | 3/2012 | Voss | H04N 5/272 |
| | | | 348/207.1 |
| 2013/0084027 A1 * | 4/2013 | Koga | G06T 3/4053 |
| | | | 382/299 |
| 2013/0094781 A1 * | 4/2013 | Koga | G06T 3/4053 |
| | | | 382/300 |

FOREIGN PATENT DOCUMENTS

JP    2008-199587 A    8/2008

OTHER PUBLICATIONS

Satoshi Kawata et al., Random Noise Removal Technology to Realize High-Quality Digital Cameras, Toshiba Review vol. 65, No. 9 (2010).

(Continued)

*Primary Examiner* — Kathleen Y Dulaney
(74) *Attorney, Agent, or Firm* — Canon USA, Inc. I.P. Division

(57) ABSTRACT

A quality of an image obtained by image processing is improved with a shorter amount of time spent in the image processing. An image processing apparatus includes, an acquisition unit configured to acquire an image, a determination unit configured to determine a quality of the acquired image, a switching unit configured to switch between settings of acquiring and not acquiring a reference image, from a communication apparatus connected to the image processing apparatus, used for improving the quality of the acquired image, based on the determined quality, and a processing unit configured to perform image processing by using the reference image acquired from the communication apparatus, in accordance with the switching by the switching unit.

11 Claims, 11 Drawing Sheets

(56) References Cited

OTHER PUBLICATIONS

Yen-wei Chen, Learning-based image quality improvement, Image restoration, and Super resolution technique, O plus E, 32(3), pp. 270 to 274, 2010-03-00.
Hideki Komori, the Journal of the Institute of Image Information and Television Engineers, vol. 63, No. 10, pp. 1400 to 1402 (2009).

* cited by examiner

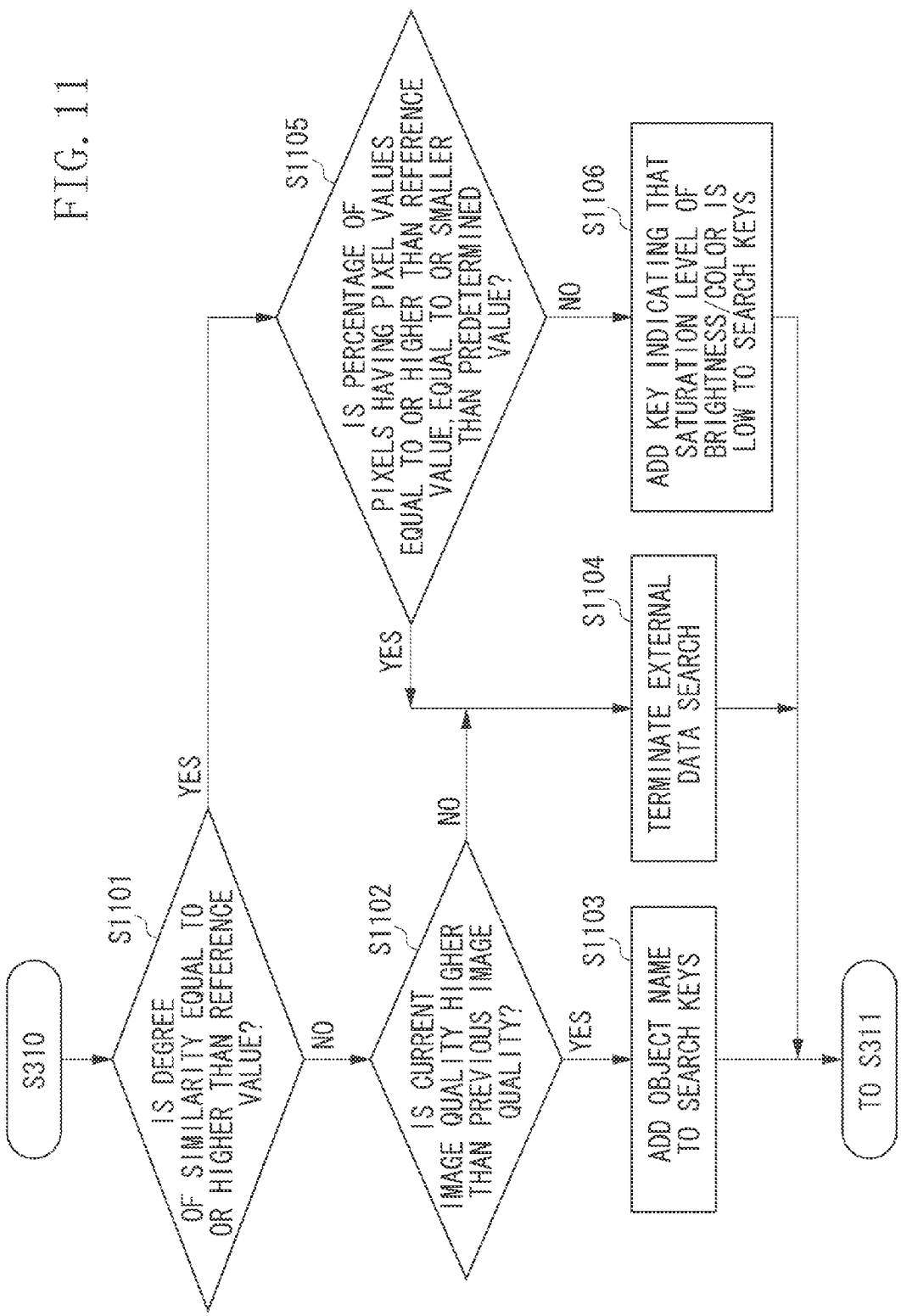

IMAGE PROCESSING APPARATUS, IMAGE PROCESSING METHOD, AND PROGRAM

BACKGROUND OF THE INVENTION

Field of the Invention

The present invention relates to an image processing apparatus, an image processing method, and a program, and more particularly relates to those used for suitably improving a quality of an image.

Description of the Related Art

For example, image processing for improving a quality of an image includes resolution conversion (image enlargement), noise reduction, and high dynamic range imaging (HDR imaging). These types of image processing include processing using a pixel adjacent to an input pixel which corresponds to a pixel to be output. These types of image processing further include processing of searching for an image area similar to an area including an input pixel corresponding to a pixel to be output and a pixel adjacent to the input pixel, and using an image of the found image area. The processing of searching for the image area similar to the area including the input pixel corresponding to the pixel to be output and the pixel adjacent to the input pixel may be performed only with an image within an apparatus or may be performed with an image in an external server. The image within the apparatus includes input images, images of past frames, and stored images within the apparatus.

For example, image enlargement by a Bicubic method and noise reduction by unsharp mask involve image processing using an input pixel corresponding to a pixel to be output, and a pixel adjacent to the input pixel. On the other hand, as the image processing, searching for and using an image area similar to an area including the input pixel corresponding to the pixel to be output, and the pixel adjacent to the input pixel is also available. Such image processing includes noise reduction through Non-Local Means described in Satoshi Kawata et al., Random Noise Removal Technology to Realize High-Quality Digital Cameras, Toshiba Review Vol. 65, No. 9 (2010) and its improved version, and learning-based superresolution processing (or database (DB) type superresolution processing) described in Hideki Komori, the Journal of the Institute of Image Information and Television Engineers, Vol. 63, No. 10, pp. 1400 to 1402 (2009).

The following technique has been disclosed in Japanese Patent Application Laid-Open No. 2008-199587, as a method for converting a resolution with superresolution. Specifically, by the technique disclosed in Japanese Patent Application Laid-Open No. 2008-199587, an image similar to an input low resolution image is searched for and acquired not only from images in an apparatus but also from stored images in a server on the Internet, as a reference image.

However, the image processing using the input pixel corresponding to a pixel to be output, and the pixel adjacent to the pixel might fail to sufficiently improve the image quality.

Further, the method of searching for the image area similar to the area including the input pixel corresponding to the pixel to be output, and the pixel adjacent to the input pixel from an image in the apparatus has the following problem. Specifically, as described in Yen-wei Chen, Learning-based image quality improvement, Image restoration, and superresolution technique, O plus E, 32(3), pp. 270 to 274, 2010-03-00, Advanced Communication Media, the image quality cannot be sufficiently improved when the found image area is not similar to the area to be output.

Furthermore, the technique disclosed in Japanese Patent Application Laid-Open No. 2008-199587 involves a process of searching for an image similar to the input image in the server on the Internet, even when an image with a sufficient quality can be obtained by the image processing using an image in the apparatus. In other words, the search on the Internet, which takes a long time, is performed even when it is unnecessary. Furthermore, the image quality obtained as a result of the image processing using the image searched on the Internet is not evaluated. Thus, whether a sufficient image quality has been obtained cannot be determined, and an image with an insufficient quality might be output.

SUMMARY OF THE INVENTION

The present invention is directed to a method of improving a quality of an image obtained by image processing while a shorter period of time is spent in the image processing.

An image processing apparatus includes, an acquisition unit configured to acquire an image, a determination unit configured to determine a quality of the acquired image, a switching unit configured to switch between settings of acquiring and not acquiring a reference image, from a communication apparatus connected to the image processing apparatus, used for improving the quality of the acquired image, based on the determined quality, and a processing unit configured to perform image processing by using the reference image acquired from the communication apparatus, in accordance with the switching by the switching unit.

Further features of the present invention will become apparent from the following description of exemplary embodiments with reference to the attached drawings.

BRIEF DESCRIPTION OF THE DRAWINGS

FIG. 11 is a flowchart illustrating processing in step S310 in the fourth exemplary embodiment.

DESCRIPTION OF THE EMBODIMENTS

Exemplary embodiments of the present invention are described below with reference to the drawings.

First, a first exemplary embodiment is described.

In the present exemplary embodiment, an image in an external apparatus (for example, a server on the Internet) is searched only when a sufficient image quality cannot be obtained with image processing using an image within an image processing apparatus that performs image processing such as resolution conversion. Thus, unnecessary searches in the external apparatus are reduced. Furthermore, in the present exemplary embodiment, when as a result of the image processing with an image obtained by the search in the external apparatus, the image quality is still not high enough, a search key is changed (altered) and the search in the external apparatus is performed again with the changed search key. Thus, a high quality image is obtained.

In the present exemplary embodiment, the search for an image in the image processing apparatus (that is, an image input to the image processing apparatus (input image), an image of a past frame that has been processed in the image processing apparatus, and a stored image in the image processing apparatus) is referred to as "internal data search" as appropriate. On the other hand, the search for an image outside the image processing apparatus (e.g., an image in a server on the Internet) is referred to as "external data search".

Before the present exemplary embodiment is described, an explanation is briefly given below on the learning-based superresolution processing described in Hideki Komori, the Journal of the Institute of Image Information and Television Engineers, Vol. 63, No. 10, pp. 1400 to 1402 (2009).

The learning-based superresolution processing is based on the following concept. First, a pair of low and high resolution images is prepared from a sample image. The processing is based on an assumption that, with respect to an image with a high degree of similarity to the low resolution image (patch image), the high resolution image (patch image) corresponding to the low resolution image (patch image) can be estimated. Here, a process of registering an association between the low resolution image (patch image) and the corresponding high resolution image (patch image) is referred to as learning. A low resolution image (patch image) close to an input low resolution image (patch image) is searched in a database, and a corresponding high resolution image (patch image) is obtained. Thus, the high resolution image corresponding to the input low resolution image can be obtained.

Figure 1:
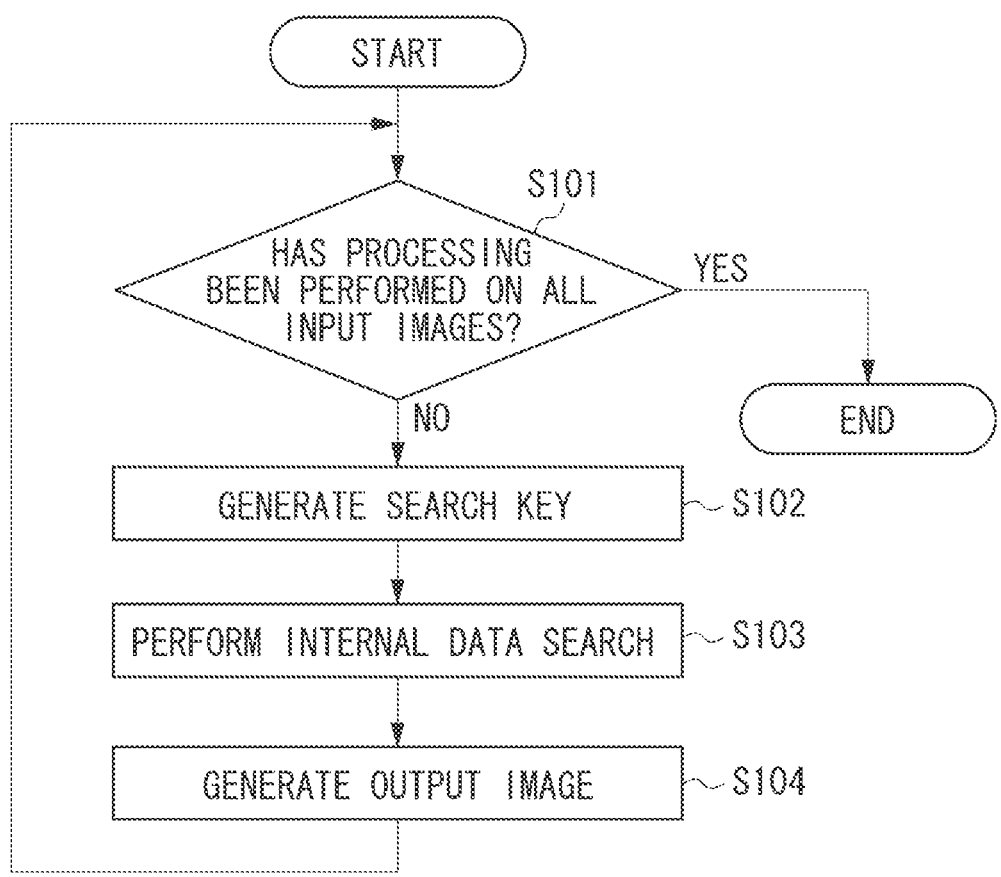
FIG. 1 is a flowchart illustrating processing performed when general learning-based superresolution processing is performed.

First, processing performed by an image processing apparatus when general learning-based superresolution processing is performed is described with reference to a flowchart in FIG. 1.

In step S101, the image processing apparatus determines whether processing in steps S102 to S104 described below has been performed on all input images. When the result of the determination indicates that the processing has been performed on all the input images (Yes in step S301), the processing in the flowchart in FIG. 1 is terminated.

On the other hand, when the processing has not been performed on all the input images (No in step S301), the processing proceeds to step S102. In step S102, the image processing apparatus generates a search key for searching for a learned low-resolution image. More specifically, the image processing apparatus divides an input image into areas having the same size as the learned low-resolution image. An area of the divided areas that has not yet been subjected to the image processing is set as the search key.

Next, in step S103, the image processing apparatus performs the internal data search. More specifically, the image processing apparatus first searches for a low resolution image similar to the search key generated in step S102 from among a plurality of sets of a learned low resolution image and a high resolution image. The search is performed through processing known as template matching. For example, the low resolution image similar to the search key is searched as follows. Specifically, a sum of absolute difference (SAD) or a sum of squared difference (SSD) between each low resolution image and an image as the search key is obtained. The low resolution image with which the smallest SAD or SSD can be obtained is determined as the low resolution image similar to the search key. The image processing apparatus that has thus obtained the low resolution image similar to the search key acquires a high resolution image corresponding to the low resolution image.

Then, in step S104, the image processing apparatus performs superresolution processing by using the high resolution image acquired through the internal data search in step S103, to generate an output image. Then, the processing returns to step S101. In a case of the simplest superresolution processing, the image processing apparatus directly outputs the high resolution image acquired through the internal data search in step S103. Alternatively, for example, the output image can be obtained as follows. The image processing apparatus performing the internal data search in step S103 calculates a degree of similarity of each low resolution image to the image as the search key. Then, in step S104, the image processing apparatus selects at least two low resolution images with the highest degrees of similarity thus calculated, in order of decreasing. Then, the image processing apparatus generates the output image by compositing high resolution images corresponding to the low resolution images thus selected, in accordance with the ratio between the calculated degrees of similarity. The degree of similarity can be calculated by using the SAD or the SSD for example.

Next, an image processing apparatus according to the present exemplary embodiment that performs the learning-based superresolution processing will be described.

Figure 2:
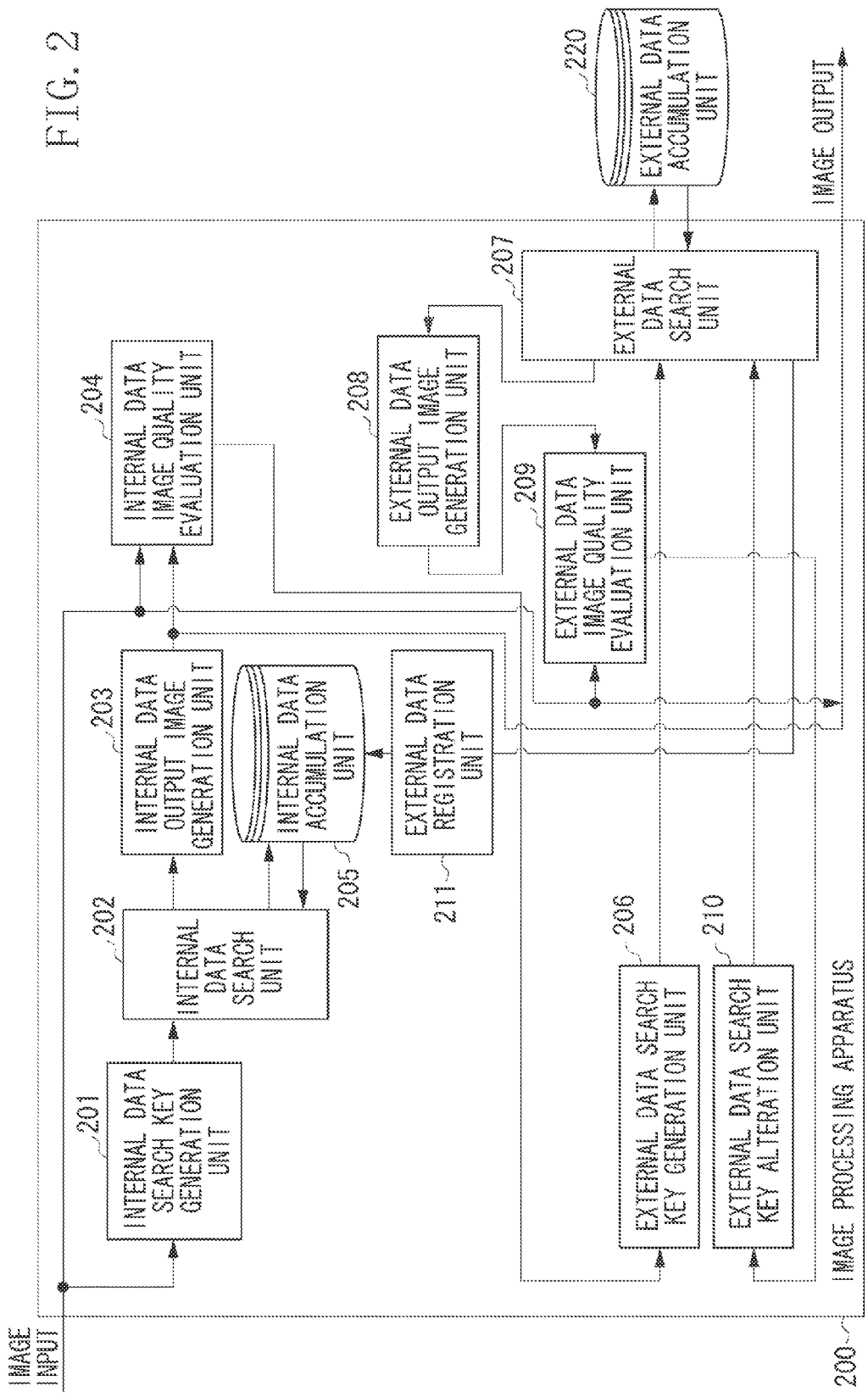
FIG. 2 is a diagram illustrating a configuration of an image processing apparatus.

FIG. 2 is a diagram illustrating a configuration of an image processing apparatus 200.

The image processing apparatus 200 includes an internal data search key generation unit 201, an internal data search unit 202, an internal data output image generation unit 203, an internal data image quality evaluation unit 204, and an internal data accumulation unit 205. The image processing apparatus 200 further includes an external data search key generation unit 206, an external data search unit 207, an external data output image generation unit 208, an external data image quality evaluation unit 209, an external data search key alteration unit 210 (hereinafter, referred to as a key alteration unit 210), and an external data registration unit 211. The image processing apparatus 200 is connected to an external data accumulation unit 220 through a communication line such as the Internet, in a mutually communicable manner. The external data search unit 207 searches data stored in the external data accumulation unit 220 and receives a result of the search.

Figure 3:
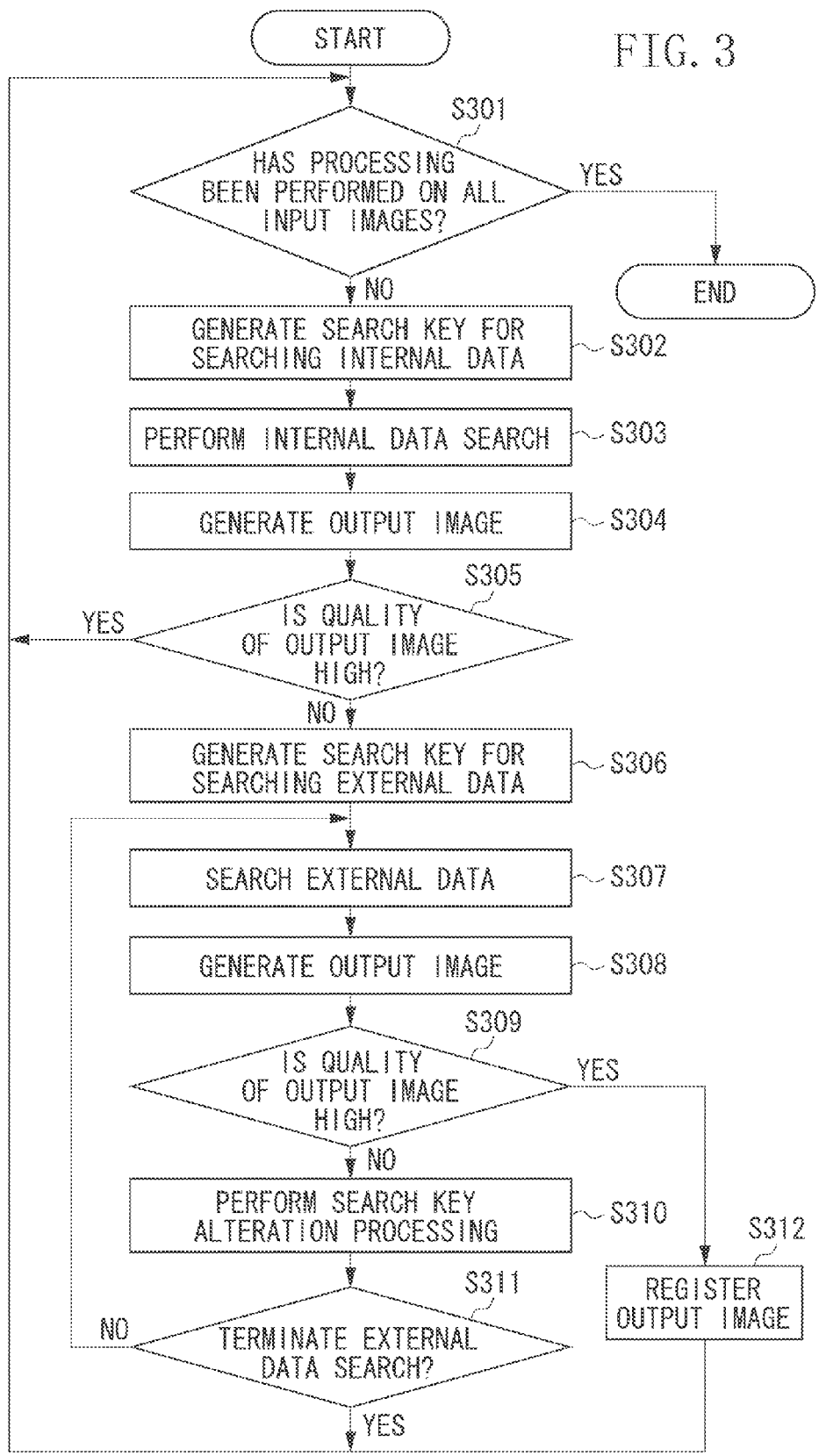
FIG. 3 is a flowchart illustrating processing performed by the image processing apparatus.

An example of processing performed by the image processing apparatus 200 is described with reference to a flowchart in FIG. 3. In step S301, the image processing apparatus determines whether any of the areas obtained by dividing the input image, has not yet been subjected to image processing. More specifically, the image processing apparatus determines whether processing at and after step S302 has been performed on all the input images, as in step S101. When the result of the determination indicates that the processing has been performed on all the input images (Yes in step S301), the processing in the flowchart in FIG. 3 is terminated.

On the other hand, when not all the input images have been subjected to the processing (No in step S301), the processing at and after step S302 is performed on an area to be output next, of the areas obtained by dividing the input image. In step S302, the internal data search key generation unit 201 generates the search key for searching for the learned low resolution image (internal image) stored in the internal data accumulation unit 205, as in step S102. More specifically, the internal data search key generation unit 201 sets an area that is the area obtained by dividing the input image, has the size that is the same as the learned low resolution image, and has not yet been subjected to the image processing, as the search key.

Next, in step S303, the internal data search unit 202 performs the internal data search as in step S103. More specifically, the internal data search unit 202 first searches for the low resolution image similar to the search key generated in step S302, from among a plurality of sets of a learned resolution image and a high resolution image stored in the internal data accumulation unit 205. The internal data search unit 202 acquires the high resolution image corresponding to the low resolution image thus found, from the internal data accumulation unit 205.

Next, in step S304, the internal data output image generation unit 203 generates an output image by performing the superresolution processing with the high resolution image acquired by the internal data search in step S303, as in step S104.

Then, in step S305, the internal data image quality evaluation unit 204 evaluates the quality of the output image generated in step S304 to determine whether the quality of the output image is high (whether image quality meets criteria). When a result of the determination indicates that the quality of the output image is high (Yes in step S305), the processing returns to step S301.

For example, the quality of the output image can be evaluated in step S305 as follows. The internal data image quality evaluation unit 204 first obtains the maximum value of the degree of similarity between the low resolution image stored in the internal data accumulation unit 205, and the image (search key) of the area as the processing target. The degree of similarity has been calculated when the internal data search is performed in step S303. The internal data image quality evaluation unit 204 determines whether the maximum value of the degree of similarity thus obtained is equal to or higher than a reference value. The quality of the output image is determined to be high (the image quality meets the criteria) when the result of the determination indicates that the maximum value of the degree of similarity is equal to or higher than the reference value, and is determined to be low (the image quality fails to meet the criteria) when the result of the determination does not indicates that the maximum value of the degree of similarity is equal to or higher than the reference value.

A specific example of how the image quality is evaluated is described, with the conditions that the SAD is used as the degree of similarity and the reference value is 5% of an absolute value of a per pixel difference. Here, the maximum value of the degree of similarity is determined to be equal to or larger than the reference value when the following formula is satisfied:
1.0−(the minimum value of SAD/the number of pixels in the search key/(pixel luminance maximum value−pixel luminance minimum value))≥1.0−5/100. For example, when the image data is 8 bit luminance data, the pixel luminance maximum value and the pixel luminance minimum value are 255 and 0, respectively.

On the other hand, when the quality of the output image is not high (fails to meet the criteria) (No in step S305), the processing proceeds to step S306.

In step S306, the external data search key generation unit 206 generates a search key for searching for an image (external data) stored in the external data accumulation unit 220. How the search key is generated in step S306 is described in detail later with reference to FIG. 5.

Then, in step S307, the external data search unit 207 performs the external data search by using the search key generated in step S306 or a search key altered in step S310 described below. As a result, the external data search unit 207 acquires 0 or more images. The number of images acquired includes 0 because there might be no search hit and thus no image might be acquired (the number of acquired images might be 0).

As the external data search, for example, an image may be searched on a searching site on the Internet, or on an image-sharing site on the Internet, or a movie may be searched on movie-sharing site on the Internet. Alternatively, an image searching site, dedicated for the image processing in the present exemplary embodiment, may be prepared and an image may be searched in the image searching site. The external data accumulation unit 220 is a data accumulation unit in these sites.

Then, in step S308, the external data output image generation unit 208 converts the image acquired by the external data search in step S307 into an image with a format enabling the internal data search, and the performs the superresolution processing as in step S304 to generate the output image.

Then, in step S309, the external data image quality evaluation unit 209 evaluates the image quality of the output image generated in step S308 to determine whether the quality of the output image is high (meets the criteria). The processing proceeds to step S310 when the result of the determination indicates that the quality of the output image generated in step S308 is not high (No in step S309), and proceeds to step S312 when the result indicates otherwise (Yes in step S309).

The quality of the output image can be evaluated in step S309, in the same manner as in step S305. More specifically, the external data image quality evaluation unit 209 performs the internal data search described above on the image obtained by the conversion to have the format enabling the internal data search. As described above, the external data image quality evaluation unit 209 performs the following processing when performing the internal data search. Specifically, the external data image quality evaluation unit 209 obtains the maximum value of the degree of the similarity of the low resolution image stored in the internal data accumulation unit 205, to the image (search key) of the area as the processing target. Then, the external data image quality evaluation unit 209 determines whether the degree of similarity (maximum degree of similarity) is equal to or higher than the standard value. The image quality of the output image is determined to be high when the result of the determination indicates that the degree of similarity is equal to or higher than the reference value. The image quality is determined not equal or high when the result indicates otherwise. However, the method for evaluating the image quality of the output image is not limited to the one described above. For example, the image quality of the output image may be determined based on the degree of similarity between the output image and the high resolution image stored in the internal data accumulation unit 205.

In step S310, the key alteration unit 210 performs search key alteration processing of determining whether the image quality of the image that has been input can be improved by the image processing using the image obtained by the external data search, and altering the search key for searching for the external data. The search key alteration processing is described below in detail with reference to FIG. 6.

Then, in step S311, the external data search unit 207 determines whether the external data search is to be terminated based on the result of the search key alteration processing. The processing returns to step S310 when the result indicates that the external data search is to be terminated (Yes in step S311).

On the other hand, the processing proceeds to step S307 when the external data search is not to be terminated (No in step S311), and the external data search is performed again with the search key altered by the search key alteration processing in step S310.

The processing proceeds to step S312 when the quality of the output image generated in step S308 is high (meets the criteria) in step S309 as described above. In step S312, the external data registration unit 211 registers the output image which has been determined to have a high quality in step S309 in the internal data accumulation unit 205, from among the output image converted in step S308 to have the format enabling the internal data search. Here, the external data registration unit 211 registers a set of a high resolution image as the output image determined to have the high quality and a low resolution image as an image obtained by reducing the output image. The external data registration unit 211 performs a learning process in the general learning-based superresolution processing and may employ a method other than the example described herein.

Figure 4:
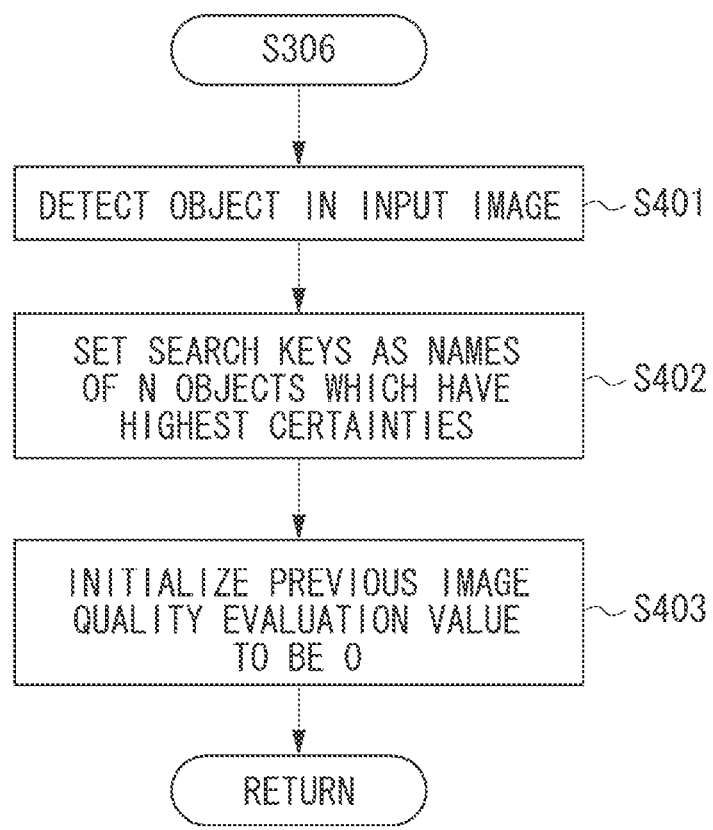
FIG. 4 is a flowchart illustrating a specific example of processing in step S306.

Next, an example of the processing in step S306 (a specific method for generating the search key for searching for an image (external data) stored in the external data accumulation unit 220) is described with reference to a flowchart in FIG. 4.

First, in step S401, the external data search key generation unit 206 detects objects in an input image. As a specific example, the input image is an image obtained by capturing the sunrise on New Year's Day over Mt. Fuji which includes a figure of a man. Furthermore, as the objects detected in the image, sun, people, mountain, sunrise, Mt. Fuji, and man are assumed to be obtained in a descending order of certainty.

Then, in step S402, the external data search key generation unit 206 sets the names of n (integer not smaller than 1) objects to be high ranked in the descending order of the certainties, as the search keys. The value of n may be fixed to an appropriate value or may be dynamically changed. In case the value of n is dynamically changed, the value can be determined with reference to the number of search keys which have been used when the quality of the output image has been determined to be high in step S309, for example.

When the value of n is statically fixed to 3, the search keys in the specific example described above are "sun, people, and mountain".

Figure 5:
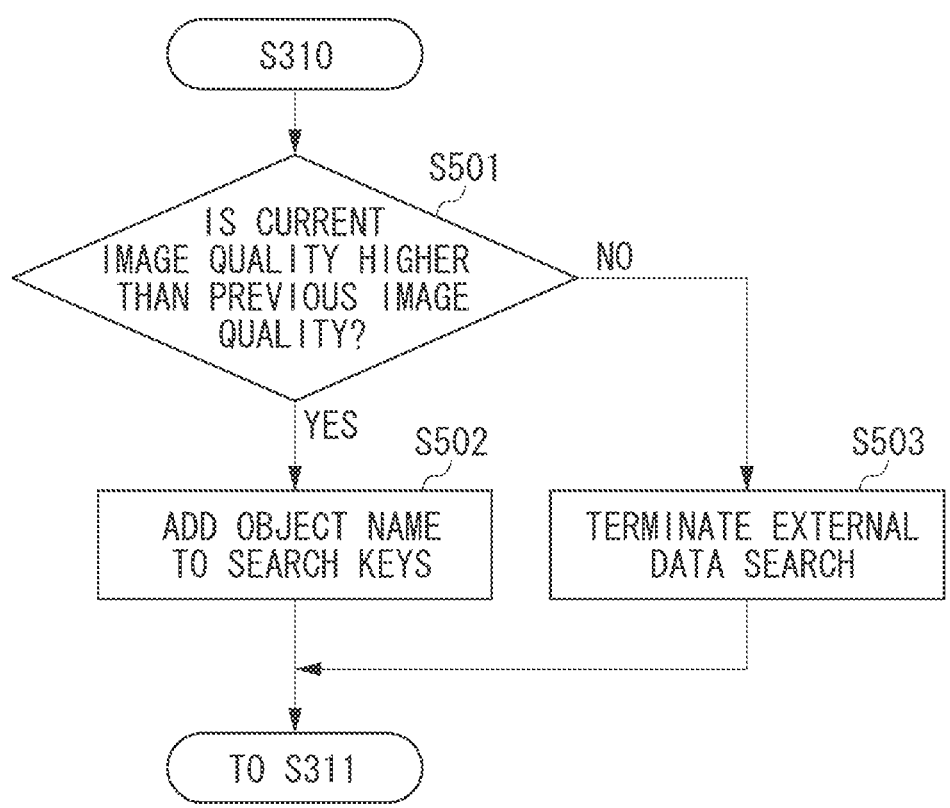
FIG. 5 is a flowchart illustrating processing in step S310 in a first exemplary embodiment.

Then, in step S403, the external data search key generation unit 206 initializes the previous degree of similarity (image evaluation value) to 0 to make a determination in step S501 in FIG. 5 described below, and the processing proceeds to step S307 in FIG. 3.

Next, an example of a detail of the search key alteration processing in step S310 will be described with reference to a flowchart in FIG. 5.

First, in step S501, the key alteration unit 210 determines whether the quality of the output image currently generated in step S308 is higher than the quality of the output image previously generated in step S308. For example, the key alteration unit 210 determines whether the quality of the output image generated by using the image searched based on the four search keys (sun, people, mountain, and sunrise) is higher than the quality of the output image generated by using the image searched based on the three search keys (sun, people, and mountain). In the example described above, whether the evaluation value (degree of similarity) currently obtained in step S309 is larger than the evaluation value (degree of similarity) previously obtained in step S309 is determined.

When the result of the determination indicates that the quality of the currently generated output image is higher than the quality of the previously generated output image (Yes in step S501), it is determined that because of the increase in the number of search key in the subsequent processing in step S502, the output image with a higher quality has been obtained through the external data search. Thus, the processing proceeds to step S502 where the key alteration unit 210 adds the name of the object with the (n+1)th highest certainty to the search keys, and updates the value of n with (n+1). For example, when n is 3 in the specific example described above, the key alteration unit 210 adds "sunrise" to the search keys so that the "sun, people, mountain, and sunrise" serve as the search keys and updates the value of n to be 4 (n=4). Then, the processing proceeds to step S311 in FIG. 3.

On the other hand, when the result of the determination indicates that the quality of the currently generated output image is not higher than the quality of the previously generated output image (No in step S501), it is determined that a more appropriate output image cannot be obtained by increasing the search key in the processing in step S502. Thus, the processing proceeds to step S503 where the key alteration unit 210 determines to terminate the external data search. Then, the processing proceeds to step S311 in FIG. 3.

As described above, in the present exemplary embodiment, the output image is generated by performing the external data search only when the quality of the output image generated by performing the superresolution processing using the high resolution image obtained through the internal data search, fails to meet the criteria. Thus, the unnecessary searches outside the image processing apparatus 200 can be reduced, whereby a period of time spent in searching for the high resolution image can be shortened.

Further, in the present exemplary embodiment, the external data search is performed again by altering the search key for the external data search, when the output image generated by performing the superresolution processing using an image obtained through the external data search fails to meet the criteria. The alteration of the search key and the re-performing of the external data search are repeated until the quality of the output image cannot be improved any further. Accordingly, the high quality output image can be obtained even when the output image with a sufficient quality cannot be obtained by the external data search with the initial search key.

The present exemplary embodiment is described in which the image processing is performed by image enlargement through the superresolution processing as an example. However, the image processing applicable to the present exemplary embodiment is not limited to this. The method described in the present exemplary embodiment can be similarly applied to any processing of searching for an image area similar to an area including an input pixel corresponding to a pixel to be output and an adjacent pixel, and performing image processing by using the found image area.

Next, a second exemplary embodiment will be described. It has been exemplarily described in the first exemplary embodiment that whether the quality of the output image generated in step S308 is high can be determined by using as an index only the degree of similarity between the output image and the high resolution image stored in the internal data accumulation unit 205. In the present exemplary embodiment, whether the quality of the output image generated in step S308 is high is determined by using a plurality of different indexes. The search key is changed in accordance with the result of determining the image quality based on each of the indexes. Thus, the present exemplary embodiment is mainly different from the first exemplary embodiment in the processing of determining whether the quality of the output image generated by using the image obtained through the external data search is high, and the processing of altering the search key. Thus, in the description of the present exemplary embodiment, the portions that are the same as the counterparts in the first exemplary embodiment are assigned the same reference numerals as in FIGS. 1 to 5 and are not described in detail.

Figure 6:
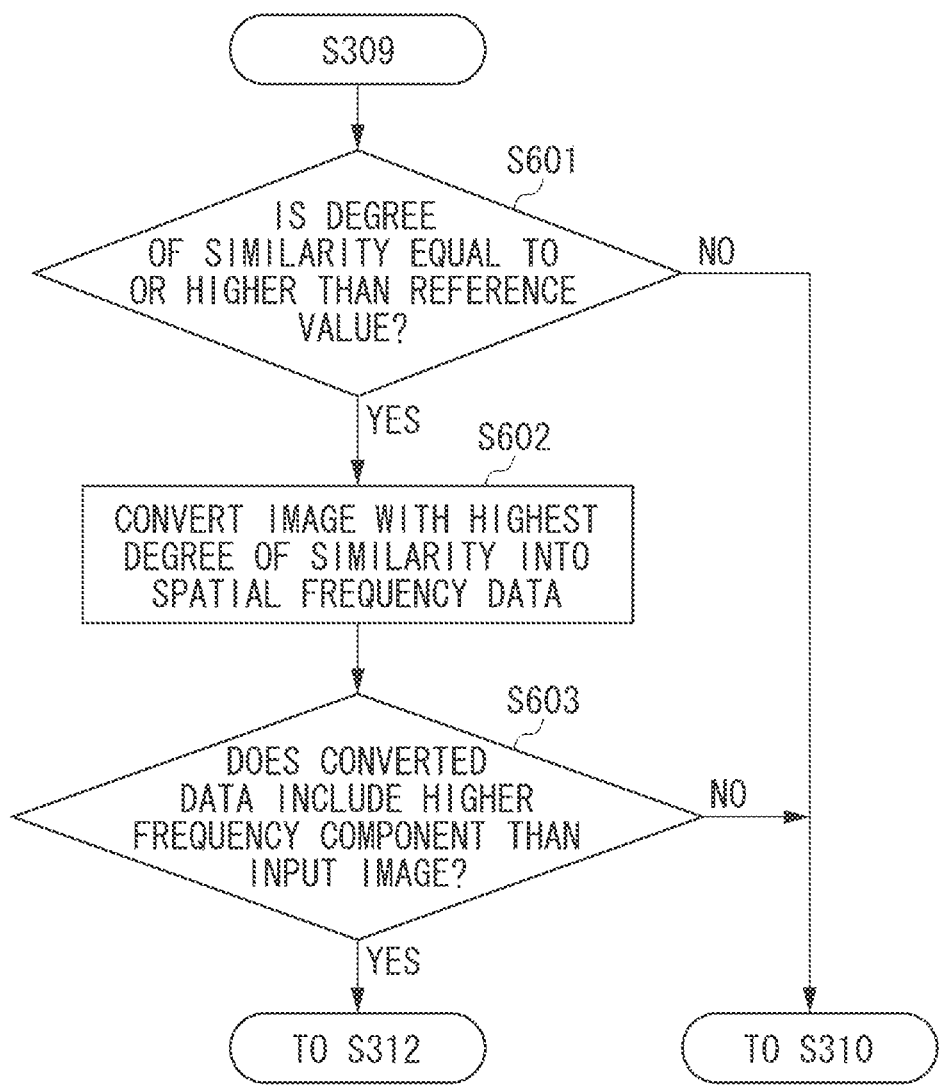
FIG. 6 is a flowchart illustrating processing in step S309 in a second exemplary embodiment.

FIG. 6 is a flowchart illustrating an example of specific processing in step S309 (a specific method for evaluating the quality of the output image generated in step S308).

First, in step S601, the external data image quality evaluation unit 209 determines whether the degree of similarity is equal to or higher than the reference value. The determination can be made in the same manner as in step S309 described above for example, and thus will not be described in detail.

When the result of the determination indicates that the degree of similarity is equal to or lower than the reference value (No in step S601), the external data image quality evaluation unit 209 determines that the quality of the output image is not high, and the processing proceeds to step S310 (a flowchart in FIG. 7 described below).

On the other hand, when the degree of similarity is equal to or higher than the reference value (Yes in step S601), the processing proceeds to step S602. In step S602, the external data image quality evaluation unit 209 converts the high resolution image corresponding to the low resolution image showing the highest similarity to data (output image) converted in step S308, into spatial frequency data.

Then, in step S603, the external data image quality evaluation unit 209 determines whether the spatial frequency data obtained by the conversion, includes a higher frequency component than the input image.

For example, the external data image quality evaluation unit 209 may determine that when the spatial frequency data obtained by the conversion, includes data showing a higher frequency than a frequency component in the input image, the spatial frequency data obtained by the conversion includes a higher frequency component than the input image. Alternatively, the external data image quality evaluation unit 209 may determine that when the spatial frequency data obtained by the conversion, includes a larger number of data showing a frequency higher than a predetermined frequency compared with the input image, the spatial frequency data obtained by the conversion, includes a higher frequency component than the input image.

When the result of the determination indicates that the spatial frequency data obtained by the conversion, includes a higher frequency component than the input image (Yes in step S602), the external data image quality evaluation unit 209 determines that the quality of the output image is high, and the processing proceeds to step S312 in FIG. 3. On the other hand, when the spatial frequency data obtained by the conversion, does not include a higher frequency component than the input image (No in step S602), the external data image quality evaluation unit 209 determines that the quality of the output image is not high, and the processing proceeds to step S310 (the flowchart in FIG. 7 described below).

Figure 7:
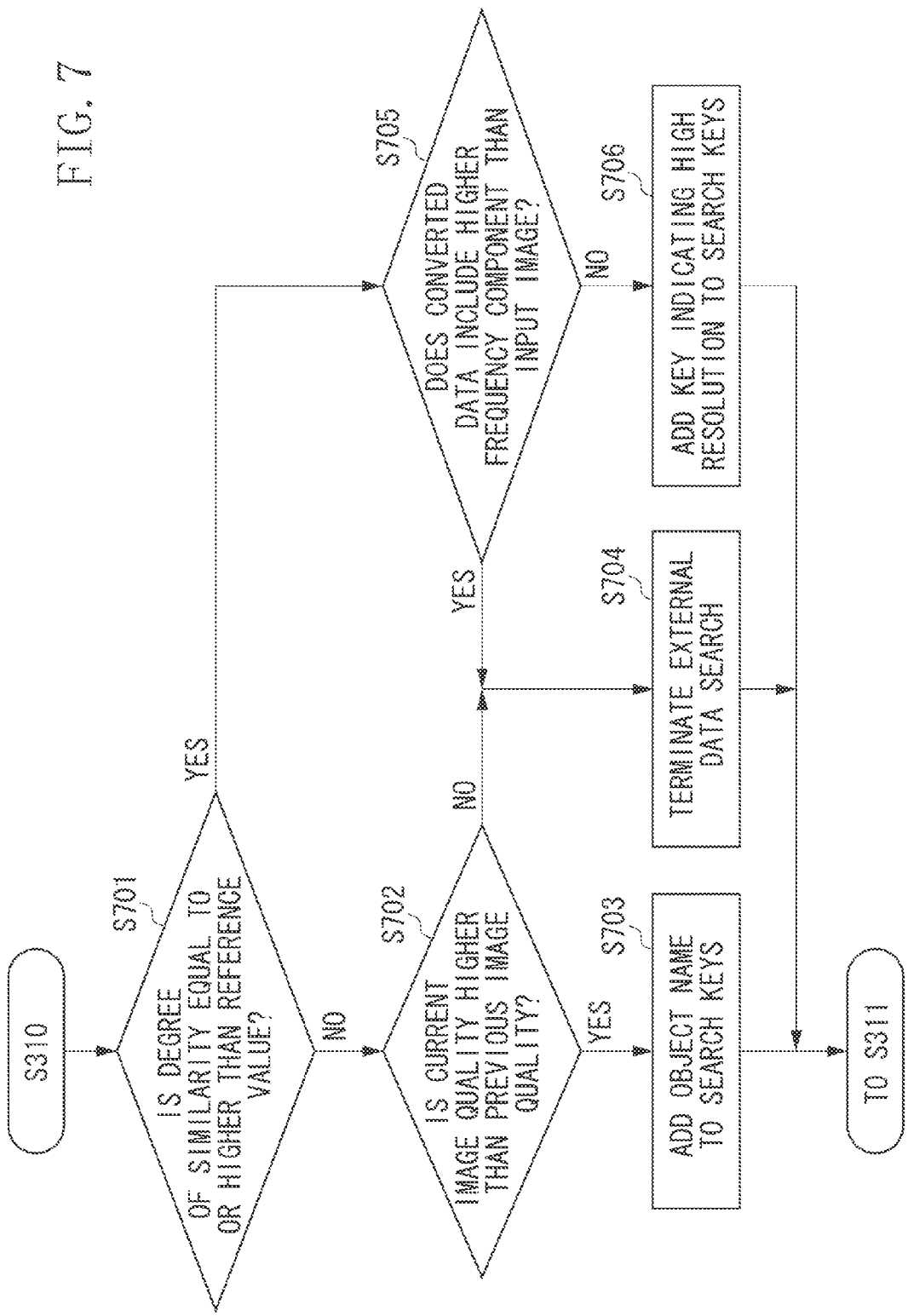
FIG. 7 is a flowchart illustrating processing in step S310 in the second exemplary embodiment.

FIG. 7 is the flowchart illustrating a specific example of a detail of the search key alteration processing in step S310. The processing in the flowchart in FIG. 7 replaces the processing in the flowchart in the flowchart in FIG. 5.

First, in step S701, the key alteration unit 210 determines whether the degree of similarity is equal to or higher than the reference value. The determination can be made in the same manner as in step S309 for example, and thus will not be described in detail. However, the reference value used in S701 can be made different from the reference value in step S309 (step S601). When the result of the determination indicates that the degree of similarity is equal to or higher than the reference value (Yes in step S701), the processing proceeds to step S705 described below.

When the degree of similarity is not equal to or higher than the reference value (No in step S701), the processing proceeds to step S702. In step S702, the key alteration unit 210 determines whether the quality of the output image currently generated in step S308 is higher than the quality of the output image previously generated in step S308.

When the result of the determination indicates that the quality of the currently generated output image is higher than the quality of the previously generated output image (Yes in step S702), the processing proceeds to step S703. In step S703, the key alteration unit 210 adds the name of the object showing the (n+1)th highest certainty, to the search keys, and updates the value of n with (n+1). Then, the processing proceeds to step S311 in FIG. 3.

On the other hand, when the quality of the currently output image is not higher than a quality of a previously generated image (No in step S702), the processing proceeds to step S704. In step S704, the key alteration unit 210 determines to terminate the external data search as in step S503. As described above, the processing proceeds to step S705 when the degree of similarity is determined to be equal to or higher than the reference value in step S701. In step S705, the key alteration unit 210 determines whether the spatial frequency data obtained by the conversion, includes a higher frequency component than the input image.

When the result of the determination indicates that the spatial frequency data obtained by the conversion, includes a higher frequency component than the input image, the quality of the output image currently generated in step S308 is determined to be sufficiently high, and the processing proceeds to step S704 where the key alteration unit 210 determines to terminate the external data search.

On the other hand, when the spatial frequency data obtained by the conversion, does not include a higher frequency component than the input image, the processing proceeds to step S706. In step S706, the key alteration unit 210 adds at least one or more keys indicating a high resolution, to the search keys. For example, the key indicating a high resolution includes information such as (minimum value) of a resolution, (minimum value) of an image size, the name of a model or a series of a high resolution single lens camera, Full high definition (HD), 4K, 8K, and ultra HD.

As described above, in the present exemplary embodiment, a quality of an output image generated by performing the superresolution processing using an image obtained through the external data search, is evaluated according to a plurality of indexes. The method for altering the search key is differentiated in accordance with a result of each evaluation. More specifically, an object name is added to the search keys when the current output image has a higher quality than the previous output image. A search key for searching for a high resolution image is added to the search keys when the output image does not have a higher frequency component than the input image. Accordingly, an output image showing an even higher quality can be obtained through the external data search.

A third exemplary embodiment is described. In the present exemplary embodiment, the image processing corresponds to noise reduction through Non-Local Means described in Satoshi Kawata et al., Random Noise Removal Technology to Realize High-Quality Digital Cameras, Toshiba Review Vol. 65, No. 9 (2010) and its improved version. The present exemplary embodiment is different from the second exemplary embodiment in that a noise amount is used instead of the high frequency component for the evaluation of the image quality in step S309 (FIG. 6) in FIG. 3. In the present exemplary embodiment, the search key is changed in step S310 (FIG. 7) in FIG. 3, a key indicating a low noise is added to the search keys, instead of the key indicating the high resolution. In present exemplary embodiment, the output image is generated in step S304 as follows. A plurality of images with high degrees of similarity to the input image is selected, and the selected images are combined in accordance with a ratio between the degrees of similarity. For example, the output image is generated as a linear sum of a plurality of images weighted in accordance with a ratio between the degrees of similarity.

As described above, the present exemplary embodiment is mainly different from the second exemplary embodiment in the processing of determining whether the quality of the output image generated by using an image obtained through the external data search, and in the processing of altering the search key. Thus, in the description of the present exemplary embodiment, portions that are the same as the first and the second exemplary embodiments are assigned the same reference numerals in FIGS. 1 to 7 and are not described in detail.

Various methods for evaluating the noise amount have been developed. For example, the noise amount can be evaluated with "average–variance" (relationship between the average value and the variance) in each area in the output image. More specifically, the average value and the variance of the pixel values in each area of the input image are used, and the variance corresponding to the average value is extracted based on "average–variance" as a reference. When the variance of the pixel values in the area of the input image is smaller than the extracted variance, it can be determined that the output image involves a small noise amount and thus has a high quality. The present exemplary embodiment is described with a case where the noise amount is thus evaluated, as an example.

Figure 8:
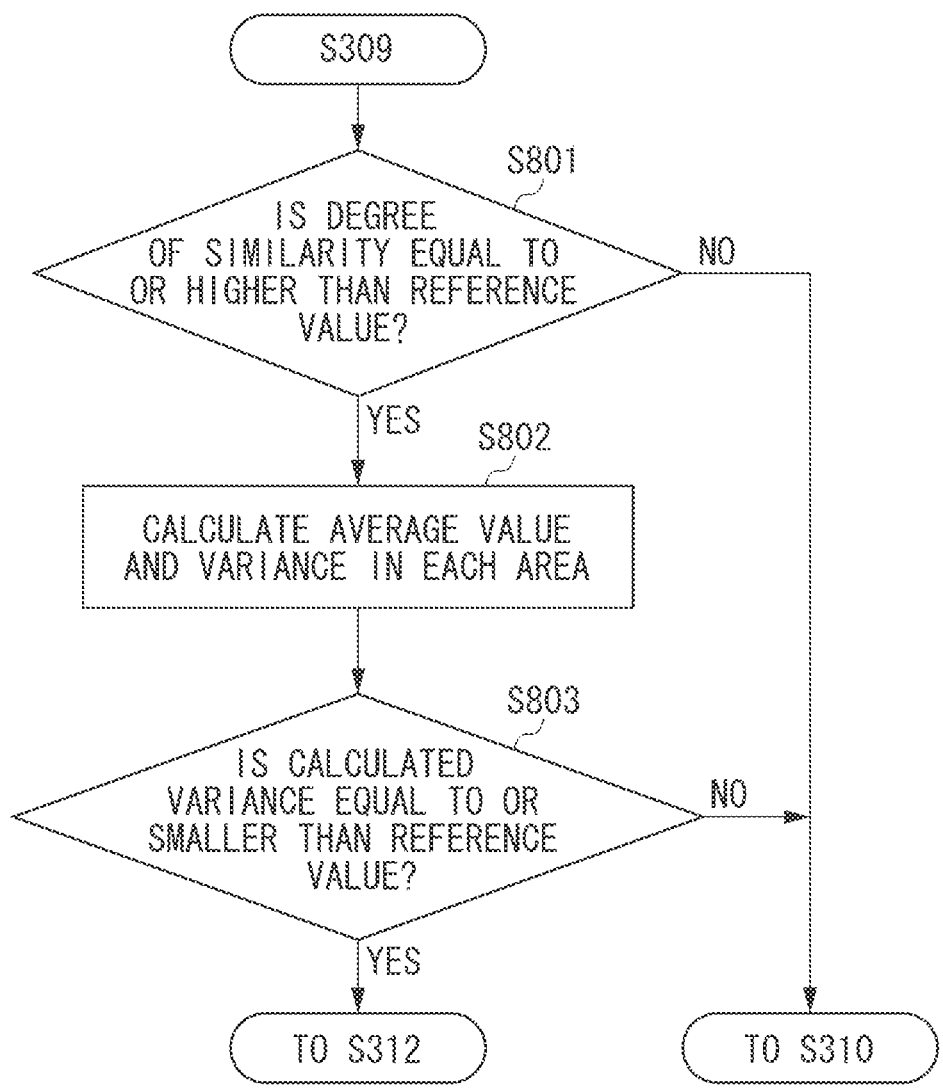
FIG. 8 is a flowchart illustrating processing in step S309 in a third exemplary embodiment.

FIG. 8 is a flowchart illustrating an example of specific processing in step S309 (a specific method for evaluating the quality of the output image generated in step S308). The processing in the flowchart in FIG. 8 replaces the processing in the flowchart in FIG. 6.

First, step S801 is the same as step S601 in FIG. 6.

In step S802, the external data image quality evaluation unit 209 calculates the average value and the variance of pixel values in each area of the output image to calculate the noise amount of each area.

Then, in step S803, the external data image quality evaluation unit 209 extracts a variance corresponding to the average value calculated in step S802, based on the "average–variance" as a reference. Then, the external data image quality evaluation unit 209 determines whether the variance calculated in step S802 is equal to or smaller than the extracted variance (reference value). When a result of the determination indicates that the variance calculated in step S802 is equal to or smaller than the extracted variance (reference value) (Yes in step S803), the external data image quality evaluation unit 209 determines that the quality of the output image is high, and the processing proceeds to strep S312 in FIG. 3.

On the other hand, when the calculated variance is not equal to or smaller than the extracted variance (reference value) (No in step S803), the external data image quality evaluation unit 209 determines that the quality of the output image is not high, and the processing proceeds to strep S310 (a flowchart in FIG. 9 described below).

Figure 9:
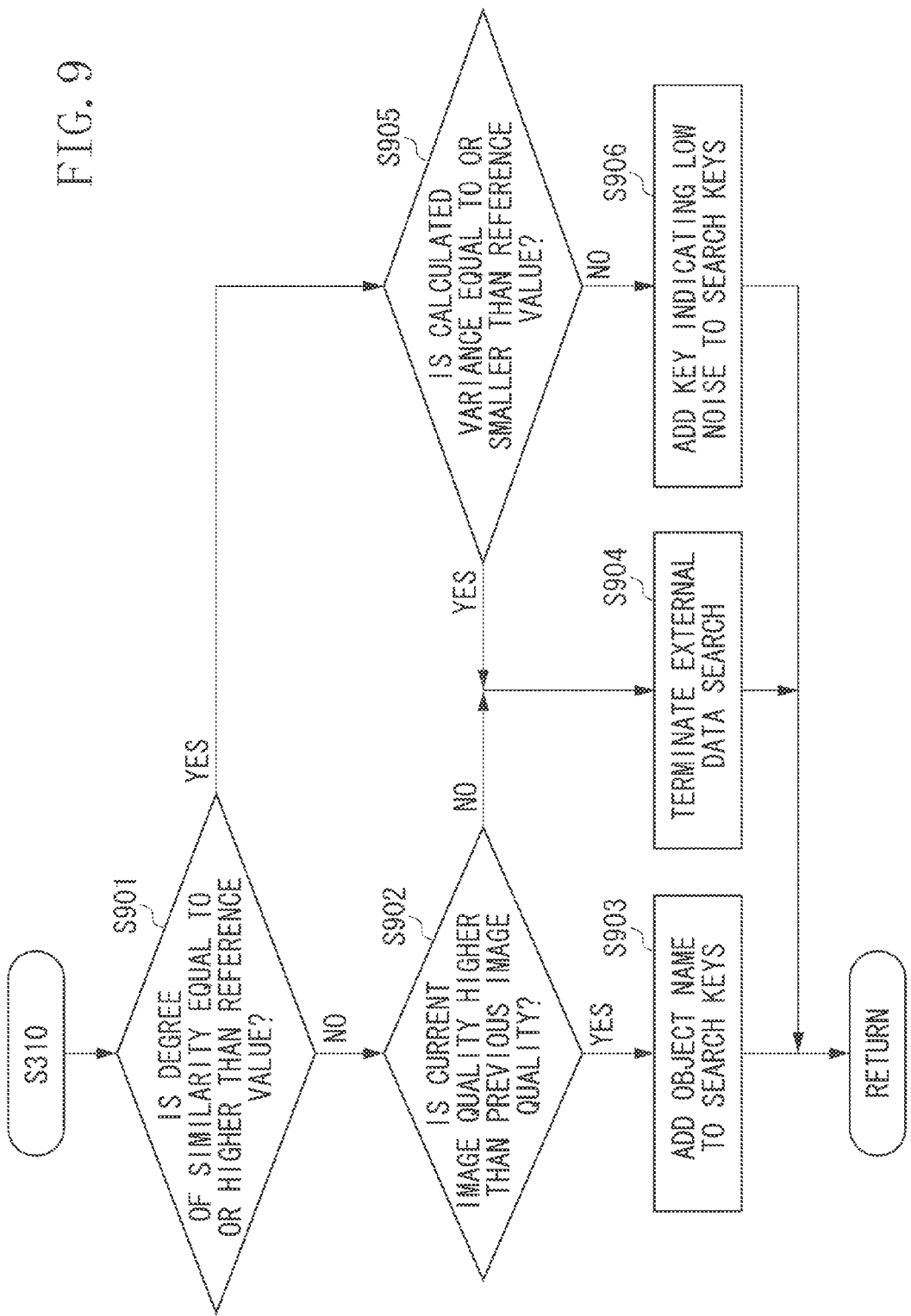
FIG. 9 is a flowchart illustrating processing in step S310 in the third exemplary embodiment.

FIG. 9 is a flowchart illustrating an example of a detail of the search key alteration processing in step S310. The processing in the flowchart in FIG. 9 replaces the processing in the flowchart in FIG. 7.

Steps S901, S902, S903, and S904 are respectively the same as steps S701, S702, S703, and S704.

In step S905, the key alteration unit 210 extracts the variance corresponding to the average value calculated in step S802 based on the "average–variance" as a reference, and the external data image quality evaluation unit 209 determines whether the dispersion extracted in step S802 is equal to or smaller than the extracted dispersion (reference value).

When the result of the determination indicates that the dispersion calculated in step S802 is equal to or smaller than the extracted dispersion (reference value) (Yes in step S905), the key alteration unit 210 determines that the quality of the output image currently generated in step S308 is sufficiently high, and the processing proceeds to step S904, where the key alteration unit 210 determines to terminate the external data search.

On the other hand, when the dispersion thus calculated is not equal to or smaller than the extracted dispersion (reference value) (No in step S905), the processing proceeds to step S906. In step S906, the key alteration unit 210 adds one or more keys indicating a low noise to the search keys. The key indicating a low noise includes information such as a resolution (lower limit value), an image size (upper limit value), the name of a model or a series of a high sensitivity/high resolution single frame camera, and a low ISO setting. The key indicating a low noise may include the image size because the noise reduction can be achieved by image reduction.

As described above, the effects that are similar to those described in the first and the second exemplary embodiment can be obtained by applying the noise reduction through Non-Local Means described in Satoshi Kawata et al., Random Noise Removal Technology to Realize High-Quality Digital Cameras, Toshiba Review Vol. 65, No. 9 (2010) and its improved version.

A fourth exemplary embodiment is described. In the present exemplary embodiment, as an example, the image processing is the HDR imaging. The present exemplary embodiment is different from the second exemplary embodiment in that a saturation level of luminance/color is used instead of the high frequency component, to evaluate the image quality in step S309 (FIG. 6) in FIG. 3. Further, in the present exemplary embodiment, the search key is altered in step S310 (FIG. 7) in FIG. 3, by adding a key indicating that the saturation level of luminance/color is low instead of adding the key indicating a high resolution. In the present exemplary embodiment, the output image is generated through the general image processing for the HDR imaging in step S304, by selecting and using an image showing a high degree of similarity to an image showing a low saturation level of luminance/color.

As a method for evaluating the saturation level of luminance/color in an image, a method of calculating a percentage of pixels having R/G/B pixel values each being equal to or higher than a reference value (around the maximum value of the data) may be employed. The low percentage indicates that the saturation level of luminance/color is low and thus the image quality is high. In the present exemplary embodiment thus as an example, the saturation level of luminance/color of an image is evaluated.

Figure 10:
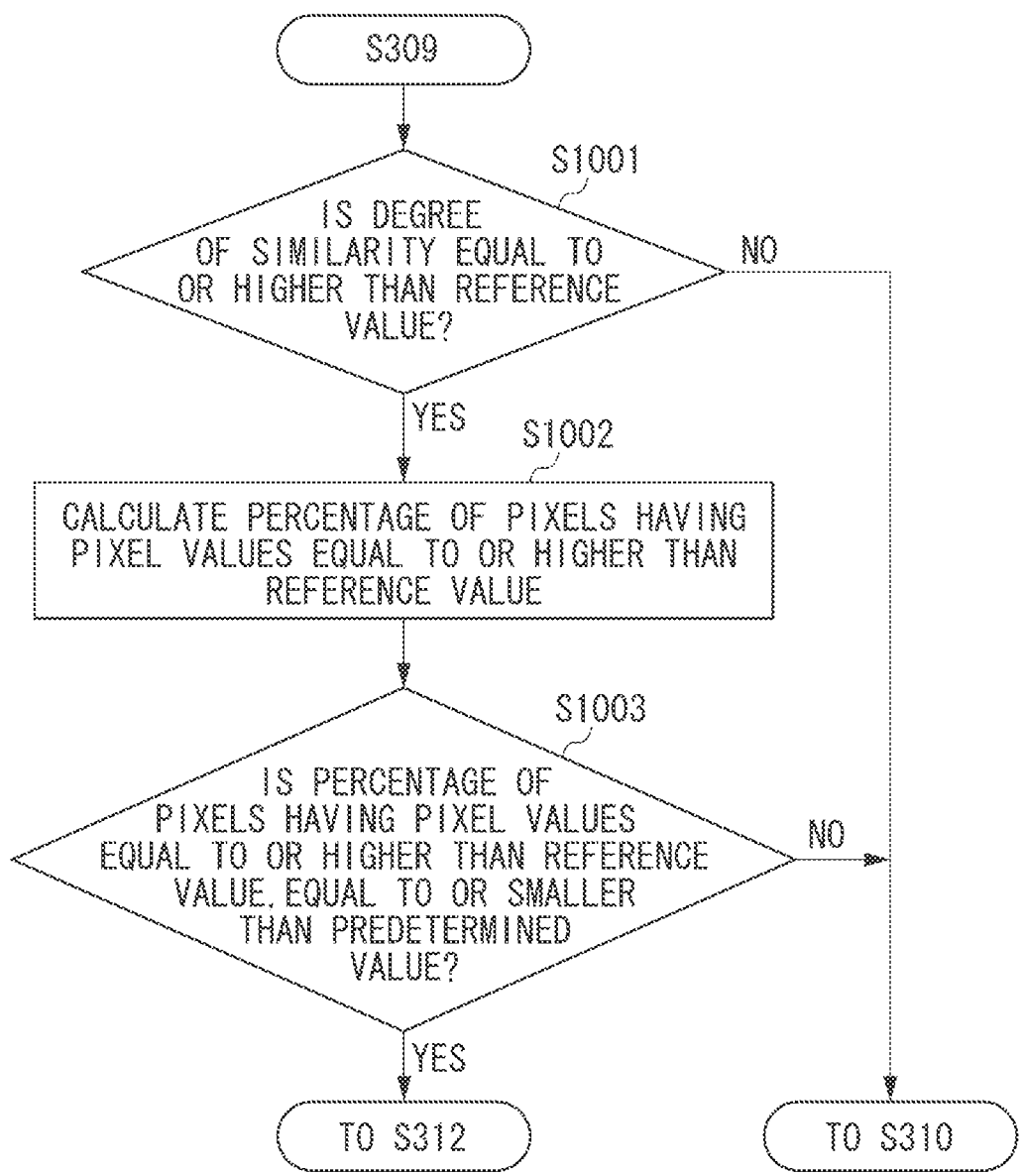
FIG. 10 is a flowchart illustrating processing in step S309 in a fourth exemplary embodiment.

FIG. 10 is a flowchart illustrating an example of specific processing in step S309 (a specific method for evaluating the quality of the output image generated in step S308).

First, step S1001 is the same as step S601 in FIG. 6.

In step S1002, the external data image quality evaluation unit 209 calculates the saturation level of luminance/color of the output image. Thus, the external data image quality evaluation unit 209 calculates the percentage of the pixels having R/G/B pixel values which are each equal to or higher than a reference value (around the maximum value of the data) among all the pixels in the output image.

Then, in step S1003, the external data image quality evaluation unit 209 determines whether the percentage of the pixels having R/G/B pixel values which are each equal to or higher than the reference value among all the pixels in the output image, is equal to or lower than a predetermined value. When a result of the determination indicates that the percentage of the pixels having R/G/B pixel values which are each equal to or higher than the reference value among all the pixels in the output image, is equal to or lower than the predetermined value (Yes in step S1003), the external data image quality evaluation unit 209 determines that the quality of the output image is high, and the processing proceeds to step S312 in FIG. 3.

On the other hand, when the percentage of the pixels having R/G/B pixel values which are each equal to or higher than the reference value among all the pixels in the output image, is not equal to or lower than the predetermined value (No in step S1003), the external data image quality evaluation unit 209 determines that the quality of the output image is not high, and the processing proceeds to step S310 (flowchart in FIG. 11 described below).

FIG. 11 is a flowchart illustrating in an example of a detail of the search key alteration processing in step S310. The processing in the flowchart in FIG. 11 replaces the processing in the flowchart in FIG. 7.

Steps S1101, S1102, S1103, and S1104 are respectively the same as steps S701, S702, S703, and S704.

In step S1105, the key alteration unit 210 determines whether the percentage of the pixels having R/G/B pixel values which are each equal to or higher than the reference value among all the pixels in the output image, is equal to or lower than the predetermined value.

When the result of the determination indicates that the percentage of the pixels having R/G/B pixel values which are each equal to or higher than the reference value among all the pixels in the output image, is equal to or lower than the predetermined value (Yes in step S1105), the key alteration unit 210 determines that the quality of the output image currently generated in step S308 is sufficiently high, and the processing proceeds to step S1104, where the key alteration unit 210 determines to terminate the external data search.

On the other hand, when the percentage of the pixels having R/G/B pixel values which are each equal to or higher than the reference value among all the pixels in the output image, is not equal to or lower than the predetermined value (No in step S1105), the processing proceeds to step S1106. In step S1106, the key alteration unit 210 adds one or more keys indicating that the saturation level of luminance/color is low, to the search keys. The key indicating that the saturation level of the luminance/color is low includes a key for information such as a luminance value (upper limit value), a color value (lower limit value), and an exposure value (EV) (upper limit value).

As described above, the effects that are the same as or similar to those described in the first and the second exemplary embodiment can be obtained also by applying the HDR imaging.

(Modified Embodiments)

In the processing in step S306 in each of the exemplary embodiments described above, the external data search key generation unit 206 may detect a feature of an image, and add the detected feature of the image to the search keys. For example, the feature of the input image may be detected as follows. The external data search key generation unit 206 analyzes at least one of a representative color and the image type (facial image, portrait image, natural image, or animation), and adds the representative color and/or the image type thus obtained to the search keys.

Thus, an output image with an even higher quality can be obtained through the external data search.

In the exemplary embodiments, one example of a first processing process, a first determination process, an acquisition process, a second processing process, a second determination process, and a change process are implemented by performing the processing in steps S304, S305, S307, S308, S309, and S310, respectively. In the second to the fourth exemplary embodiments, the degree of similarity corresponds to a first index.

In the second exemplary embodiment, the frequency component corresponds to a second index.

In the third exemplary embodiment, the dispersion in each area of the output image corresponds to the second index.

In the fourth exemplary embodiment, the percentage of the pixels having R/G/B pixel values which are each equal to or higher than the reference value among all the pixels in the output image corresponds to the second index.

The exemplary embodiments described above are merely specific examples for implementing the present invention, and do not limit the technical scope of the present invention. Thus, the present invention can be implemented in various ways without departing from the technical idea and the essential feature of the present invention.

According to an exemplary embodiment of the present invention, a quality of an image obtained by image processing can be improved with a shorter period of time spent for the image processing.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-066364 filed Mar. 27, 2014, which is hereby incorporated by reference herein in its entirety.

What is claimed is:

1. An image processing apparatus comprising:
a processor; and
a memory for storing instructions to be executed by the processor,
wherein when the instructions stored in the memory are executed by the processor, the image processing apparatus functions as:
inputting an image;
determining, based on a quality of a processed image that is obtained by performing image processing on the input image using a reference image, whether to acquire another reference image from a communication apparatus using a search key according to the input image;
identifying an object in the input image;
specifying, based on the identified object, the search key for searching for the another reference image used in performing the image processing on the input image;
acquiring, according to a result of the determining, the another reference image from the communication apparatus using the search key; and
performing image processing by using the another reference image acquired from the communication apparatus, if the another reference image is acquired.

2. The image processing apparatus according to claim 1, wherein the image processing apparatus further functions as:
determining a quality of a second processed image obtained by performing the image processing using the another reference image; and
a change unit configured to change the search key in accordance with the quality of the second processed image,
wherein the image processing on the input image is performed by using a second another reference image acquired from a communication apparatus based on the changed search key.

3. The image processing apparatus according to claim 1, wherein the image processing apparatus further functions as:
determining a quality of a first processed image obtained by performing the image processing on a first input image by using a first another reference image; and
storing the first another reference image in a memory when the quality of the first processed image is equal to or higher than a threshold,
wherein the first another reference image stored in the memory is used for the image processing on a second input image input after the first input image.

4. The image processing apparatus according to claim 1, wherein the quality of the processed image is based on a degree of similarity between the input image and the reference image.

5. The image processing apparatus according to claim 4, wherein the degree of similarity is calculated based on a difference between a pixel value of a block in the input image and a pixel value of a block in the reference image, wherein a position of the block in the input image corresponds to a position of the block in the reference image.

6. The image processing apparatus according to claim 1, wherein the image processing apparatus further functions as:
determining a plurality of types of evaluation values related to a quality of the processed image,
determining whether to change the search key based on each of the plurality of types of evaluation values; and
changing the search key in accordance with a result of the determining relating to changing of the search key,
wherein the image processing on the input image is performed by using a second another reference image acquired from a communication apparatus based on the changed search key.

7. The image processing apparatus according to claim 6, further comprising an addition unit configured to add a predetermined search key in accordance with a type of an evaluation value not exceeding a given threshold among the plurality of types of evaluation values, to the search key.

8. The image processing apparatus according to claim 1, wherein the quality of the processed image is determined based on a degree of similarity between the input image and the reference image, and a high frequency component of the processed image.

9. The image processing apparatus according to claim 1, wherein the quality of the processed image is determined based on a degree of similarity between the input image and the reference image, and a noise amount of the input image.

10. An image processing method comprising:
inputting an image;
determining, based on a quality of a processed image that is obtained by performing image processing on the input image using a reference image, whether to acquire another reference image from a communication apparatus using a search key according to the input image;
identifying an object in the input image;
specifying, based on the identified object, the search key for searching for the another reference image used in performing the image processing on the input image;
acquiring, according to a result of the determining, the another reference image from the communication apparatus using the search key; and
performing image processing by using the another reference image acquired from the communication apparatus, if the another reference image is acquired.

11. A non-transitory computer-readable medium storing a program for causing a computer to perform a method comprising:
- inputting an image;
- determining, based on a quality of a processed image that is obtained by performing image processing on the input image using a reference image, whether to acquire another reference image from a communication apparatus using a search key according to the input image;
- identifying an object in the input image;
- specifying, based on the identified object, the search key for searching for the another reference image used in performing the image processing on the input image;
- acquiring, according to a result of the determining, the another reference image from the communication apparatus using the search key; and
- performing image processing by using the another reference image acquired from the communication apparatus, if the another reference image is acquired.

* * * * *